United States Patent
Keutz

(10) Patent No.: US 6,883,832 B2
(45) Date of Patent: Apr. 26, 2005

(54) GAS BAG FOR A VEHICLE OCCUPANT RESTRAINT SYSTEM AND A GAS BAG MODULE

(75) Inventor: Markus Keutz, Rossdorf (DE)

(73) Assignee: TRW Automotive Safety Systems GmbH, Ashcaffenburg (DE)

( * ) Notice: Subject to any disclaimer, the term of this patent is extended or adjusted under 35 U.S.C. 154(b) by 133 days.

(21) Appl. No.: 10/352,016

(22) Filed: Jan. 27, 2003

(65) Prior Publication Data

US 2003/0141702 A1 Jul. 31, 2003

(30) Foreign Application Priority Data

Jan. 30, 2002 (EP) .............................................. 02001901
Dec. 3, 2002 (DE) ..................................... 202 18 732 U

(51) Int. Cl.⁷ ................................................. B60R 2/16
(52) U.S. Cl. ............................... 280/743.2; 280/743.1; 280/729; 280/731
(58) Field of Search ........................... 280/743.2, 743.1, 280/731, 729

(56) References Cited

U.S. PATENT DOCUMENTS 5,931,497 A    8/1999  Fischer 6,042,147 A  *  3/2000  Nishijima et al.  ........  280/743.1
6,536,801 B1  *  3/2003  Frisch  ......................  280/743.1
2002/0005632 A1  *  1/2002  Bohn et al.  ..............  280/728.3

FOREIGN PATENT DOCUMENTS

DE    38 33 889 A1   4/1990
DE    20102115 U1    8/2001
DE    20022018 U1    12/2001

OTHER PUBLICATIONS

U.S. Appl. No. 10/036,233, filed Dec. 26, 2001 entitled "Gas Bag Restrain Device".
U.S. Appl. No. 10/068,379, filed Feb. 6, 2002 entitled "Gas Bag Module".

* cited by examiner

Primary Examiner—Ruth Ilan
(74) Attorney, Agent, or Firm—Tarolli, Sundheim, Covell & Tummidno L.L.P.

(57) ABSTRACT

A gas bag for a vehicle occupant restraint system comprises a gas bag wall, which in the unfolded state of the gas bag (22) delimits an indentation (30) with an orifice (28) or an opening, and a closure piece (40) fastened to the gas bag wall, which in the inflated state moves in front of the orifice (28:) of the indentation or in front of the opening and covers it. The closure piece (40) is formed from at least two covering pieces, arranged one over the other, overlapping each other, which respectively have a margin section which is not fastened to the gas bag wall.

5 Claims, 1 Drawing Sheet

GAS BAG FOR A VEHICLE OCCUPANT RESTRAINT SYSTEM AND A GAS BAG MODULE

TECHNICAL FIELD

The invention relates to a gas bag for a vehicle occupant restraint system with a gas bag wall, which in the unfolded state of the gas bag delimits an indentation with an orifice or an opening, and with a closure piece fastened to the gas bag wall, which in the inflated state of the gas bag moves in front of the orifice of the indentation or in front of the opening and covers it. The invention further relates to a gas bag module with a gas bag according to the invention.

BACKGROUND OF THE INVENTION

From the EP-A-1 231 116 a gas bag of the type initially mentioned is known, which has a ring-shaped chamber which is to be inflated, which surrounds an indentation. The indentation extends from the front wall of the gas bag, facing the vehicle occupant, centrally towards the rear. The deepest point of the indentation is formed by a fabric piece which is fastened permanently to the gas bag module and therefore is not moved towards the occupant during unfolding. In the inflated state of the gas bag, the closure piece, which is fastened to the gas bag wall, covers the opening of the indentation, so that the vehicle occupant is prevented from penetrating into the indentation.

BRIEF SUMMARY OF THE INVENTION

The invention provides a gas bag with a closure piece which ensures a complete and secure covering of an indentation or of an opening of the gas bag, the gas bag making possible an optimized material distribution in the folded state and a symmetrical opening behaviour during unfolding.

This is achieved in a gas bag of the type initially mentioned in that the closure piece is formed from at least two covering pieces, arranged one over the other, overlapping each other over a large area, which respectively have a margin section which is not fastened to the gas bag wall. Through the provision of at least two covering pieces, a non-symmetrical placing of a one-part closure piece around a central holding piece of the gas bag module or the like, necessitated by the construction, is avoided. In the gas bag according to the invention, such a holding piece can extend through the closure piece, owing to the open margin sections, so that a symmetrical arrangement of the closure piece around the holding piece is possible. The stressing of the covering piece and of the section of the gas bag wall connected therewith is reduced compared with a single-layer closure piece, and the opening behaviour is not influenced, as with a single-layer closure piece which is fastened non-symmetrically. With the closure piece according to the invention, in addition to an indentation which is delimited by the gas bag wall, a gas outlet opening formed in the gas bag wall can also be covered.

The preferred embodiment of the invention makes provision that the non-fastened margin sections are arranged staggered with respect to each other. Fabric pieces sewn on to the gas bag wall are suitable as covering pieces.

A particularly simple and favorably priced manufacture is made possible in that the fabric pieces are arranged slightly staggered with respect to each other and are fastened to the gas bag wall on their outer edges by means of an encircling seam which does not take up all the margin sections of each individual fabric piece. Through the staggered arrangement of the fabric pieces, a single encircling seam is sufficient to fasten the fabric pieces to the gas bag wall and at the same time to form the open margin sections, through which a holding piece or the like can extend. Therefore, the sewing work for the closure piece is reduced to a minimum.

Preferably, the covering pieces are rectangular and the margin section of one covering piece, not fastened to the gas bag wall, is opposed to the margin section of the other fabric piece which is not fastened to the gas bag wall. The covering pieces may, however, also have the form of a triangle or of a half moon.

The invention also provides a gas bag module with a gas bag in which the gas bag wall has a front and a rear wall section, an indentation running in the direction of the wall section on the rear side from the front wall section in the inflated state, which is formed in that a part of the gas bag wall is prevented from an unimpeded movement towards the outside of the module during the unfolding of the gas bag. With such a gas bag module, excellent restraint values are achieved by the gas bag according to the invention.

According to the preferred embodiment, a centrally arranged holding piece is provided in the gas bag module, which delimits a ring-shaped chamber to accommodate the folded gas bag on the inner side and which in the folded state of the gas bag extends inside the indentation, the margin sections not fastened to the gas bag wall surrounding the holding piece in the folded state of the gas bag, so that the holding piece extends through the closure piece. The holding piece generally serves to prevent a central part of a covering of the module from moving outwards. In the folded state of the gas bag, the holding piece extends inside the indentation, with the indentation moving along the holding piece on unfolding and leaving the module via a ring-shaped outlet opening.

Further features and advantages of the invention will be apparent from the following description of a preferred embodiment and from the following drawings, to which reference is made. In the drawings:

DETAILED DESCRIPTION OF THE PREFERRED EMBODIMENTS

Figure 1:
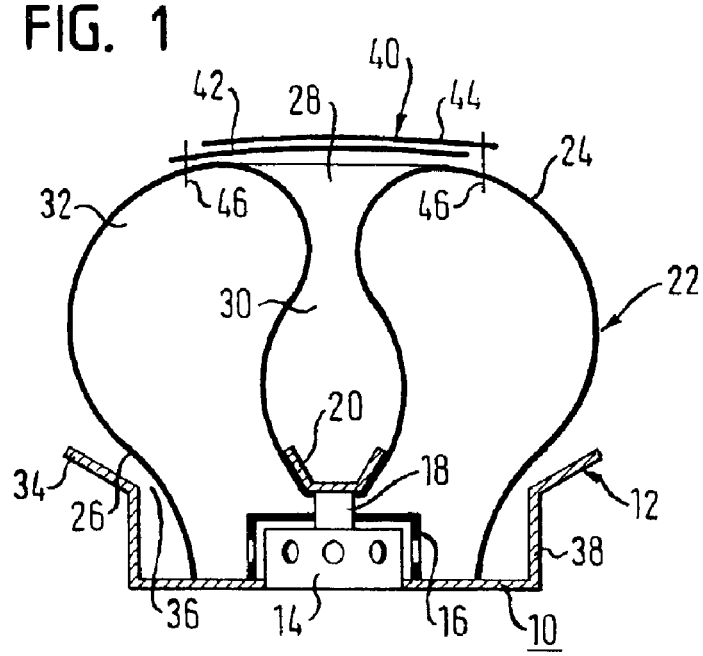
FIG. 1 shows a longitudinal sectional view through a gas bag module according to the invention with a fully inflated gas bag according to the invention.

In FIG. 1 a gas bag module is illustrated, which can be housed in the steering wheel of a vehicle. The gas bag module has a mounting housing 10 which is closed on the front side by a covering 12. In the module, a gas generator 14 is housed, which is surrounded by a diffusor 16. Projecting from the end face of the diffusor 16 is a holding piece 18 in the form of a tube on which a central piece 20 of the one-piece covering 12 is fastened, so that the latter is prevented from swiveling outwards on opening of the covering 12.

A gas bag 22 housed in the mounting housing 10 of the module has a gas bag wall which surrounds a front wall section 24, facing the occupant in the inflated state, and a rear wall section 26. The front wall section 24 has a central opening which forms an orifice 28 of an indentation 30. The indentation 30 is produced in that a part of the gas bag wall, namely the actual centre of the front wall section, is prevented by the holding piece 18 and the central piece 20 from a movement in the direction of the occupant. Through the indentation 30, which is not filled with gas, a ring-shaped chamber 32 is produced, which is to be filled with gas.

In the folded state, the gas bag 22 is housed in the module in an annular space which is delimited radially on the inner side by the cage 16 and the holding piece 18 and also on the outer side by the peripheral wall 38 of the module housing 10. Reference 34 designates the sections of the covering 12 which detach themselves from the central piece 20 on unfolding of the gas bag 22 and swivel outwards to free an annular outlet opening 36.

Figure 2:
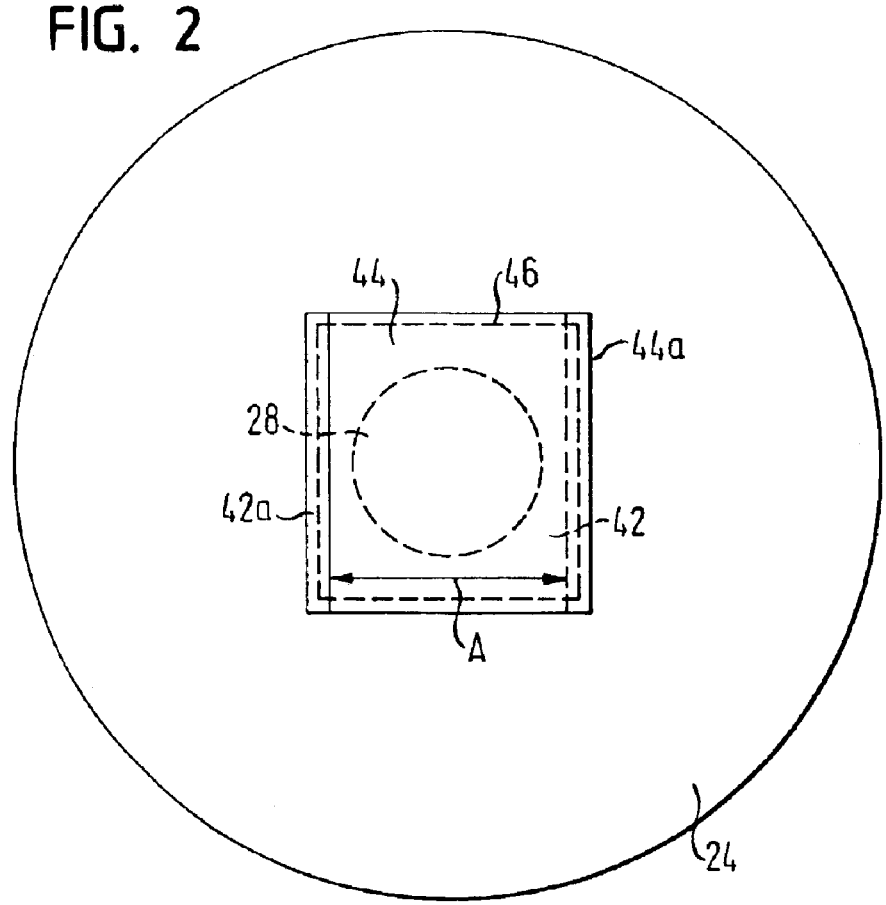
FIG. 2 shows a top view onto the front wall section of the gas bag of FIG. 1.

So that the occupant who strikes onto the wall section 24 can not penetrate into the indentation 30, the gas bag 22 has a closure piece 40 which is arranged so that it moves in the inflated state, as illustrated, in front of the orifice 28 of the indentation 30 and closes it. The closure piece 40 consists of two rectangular covering pieces, lying one over the other, which are constructed as fabric pieces 42 and 44 and have an identical shape. The fabric pieces 42 and 44 are arranged so as to be staggered slightly with respect to each other, so that they overlap each other completely, with the exception of two opposed marginal regions 42a and 44a. The closure piece 40 is fastened to the front wall section 24 of the gas bag 22 by means of an encircling seam 46, the seam 46 only taking up one fabric piece 44 or respectively 42 on the sides of the non-overlapping margin sections 42a and 44a respectively, and taking up both fabric pieces 42 and 44 on the other two sides of the closure piece (see FIGS. 1 and 2). Therefore, each fabric piece 42, 44 has a non-sewn (open) side, which is opposed to the open side of the other fabric piece.

On installation of the gas bag 22 into the module, the two open sides of the closure piece 40 are placed around the holding piece 18, so that in the folded state of the gas bag 22, the holding piece extends through the closure piece 40. On unfolding of the gas bag 22, the open sides of the closure piece 40 move along the holding piece 18 and the central piece 20 and then leave these. Then the fabric pieces 42, 44 move over the orifice 28 of the indentation 30 and close this completely.

The overlapping region of the two fabric pieces 42, 44, which can be indicated in the embodiment described above by the measurement A (see FIG. 2), is dimensioned as a function of the size of the orifice lying therebeneath, which is to be covered, so as to be so great that a penetration of the vehicle occupant into the indentation 30 is avoided.

Instead of fabric pieces 42, 44 cut in a rectangular shape, differently shaped fabric pieces (e.g. triangular or half-moon-shaped) with opposed open sides can also be used for the closure piece 40, which can be placed around the holding piece 18. The term "opposed" in this case is to be understood to mean that two identical sides of fabric pieces, lying one over the other, are not open. It is also possible to provide a closure piece 40 with more than two layers, whereby the positive symmetry characteristics of the covering design according to the invention can be further improved.

What is claimed is:

1. A gas bag for a vehicle occupant restraint system, with a gas bag wall, which in the unfolded state of the gas bag (22) delimits an indentation (30) with an orifice (28) or an opening, and a closure piece (40) fastened to the gas bag wall, which in the inflated state moves in front of the orifice (28) of the indentation or in front of the opening and covers it, characterized in that the closure piece (40) is formed from at least two covering pieces, arranged one over the other, overlapping each other, which respectively have a margin section which is not fastened to the gas bag wall.

2. A gas bag according to claim 1, characterized in that the non-fastened margin sections are arranged so as to be staggered with respect to each other.

3. The gas bag according to claim 1, characterized in that the covering pieces are fabric pieces (42, 44) which are sewn on to the gas bag wall.

4. The gas bag according to claim 3, characterized in that the fabric pieces (42, 44) are arranged so as to be slightly staggered with respect to each other and are fastened to the gas bag wall on their outer edges by means of an encircling seam (46) which does not take up all the margin sections of each individual fabric piece (42, 44).

5. The gas bag according claim 1, characterized in that the covering pieces are rectangular and the margin section of the one covering piece which is not fastened to the gas bag wall is opposed to the margin section of the other covering piece which is not fastened to the gas bag wall.

* * * * *